(12) United States Patent
Hudson et al.

(10) Patent No.: US 11,536,001 B2
(45) Date of Patent: Dec. 27, 2022

(54) TRUSS FOUNDATIONS WITH IMPROVED CORROSION RESISTANCE AND RELATED SYSTEMS, METHODS AND MACHINES

(71) Applicant: Ojjo, Inc., San Rafael, CA (US)

(72) Inventors: Tyrus Hudson, Petaluma, CA (US); Jack West, San Rafael, CA (US); Charles Almy, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 209 days.

(21) Appl. No.: 16/415,254

(22) Filed: May 17, 2019

(65) Prior Publication Data

US 2020/0248424 A1      Aug. 6, 2020

Related U.S. Application Data

(60) Provisional application No. 62/820,776, filed on Mar. 19, 2019, provisional application No. 62/801,604, filed on Feb. 5, 2019.

(51) Int. Cl.
*E02D 5/80* (2006.01)
*H02S 20/10* (2014.01)

(52) U.S. Cl.
CPC ............. *E02D 5/801* (2013.01); *H02S 20/10* (2014.12)

(58) Field of Classification Search
CPC .. E02D 5/801; E02D 5/56; E02D 5/52; E02D 5/523; E02D 5/526; E02D 5/60; E02D 31/06; H02S 20/10; H02S 20/32; H02S 20/30; F24S 25/12; F24S 25/617; F24S 30/425; Y02E 10/47; Y02E 10/50; E04H 12/2215; E04H 12/2223; E04H 12/2269
See application file for complete search history.

(56) References Cited

U.S. PATENT DOCUMENTS 5,822,940 A * 10/1998 Carlin .................... E04C 2/384
                                                              52/459
6,508,349 B1 * 1/2003 Lewin ................... G07F 17/248
                                                              194/350
6,659,692 B1 * 12/2003 May ....................... E02D 35/00
                                                              405/230

(Continued)

FOREIGN PATENT DOCUMENTS

CN      201413872 Y  *  2/2010
CN      103061333 A  *  4/2013  ........... B23K 33/006

(Continued)

OTHER PUBLICATIONS

Ingal Specifiers Manual, https://www.steel.org.au/resources/elibrary/resource-items/powder-coating-over-galvanised-items-ingalsm3/download-pdf.pdf/; Nov. 21, 2015 (Year: 2015).*

*Primary Examiner* — Ryan D Kwiecinski
(74) *Attorney, Agent, or Firm* — Phillip D. Mancini; Ojjo, Inc.

(57) ABSTRACT

A pair of truss legs forming an A-frame-shaped truss foundation system, wherein each truss leg is formed from a hollow lower screw anchor having threading around its lower end connected to an upper leg, wherein both the screw anchor and the upper leg have corrosion protection layers formed on their inner and outer surfaces thereof, but wherein only the screw anchor also has a second corrosion protection layer formed over the first protection layer on its outer surface only.

7 Claims, 6 Drawing Sheets

(56) References Cited

U.S. PATENT DOCUMENTS

| | | | | |
|---|---|---|---|---|
| 7,416,367 B2* | 8/2008 | St. Onge | | E02D 5/80 |
| | | | | 405/230 |
| 7,490,964 B2* | 2/2009 | Haddad | | E04H 12/2292 |
| | | | | 362/431 |
| 8,096,368 B1* | 1/2012 | Rider | | E04H 17/263 |
| | | | | 173/90 |
| 8,609,977 B2* | 12/2013 | Jones | | F24S 30/425 |
| | | | | 250/203.1 |
| 8,926,228 B2* | 1/2015 | Stroyer | | E02D 5/52 |
| | | | | 175/323 |
| 9,068,318 B1* | 6/2015 | Gochis | | E02D 5/28 |
| 9,340,944 B2* | 5/2016 | Kahlman | | E02D 5/22 |
| 9,932,718 B2* | 4/2018 | Blevins | | E04H 9/021 |
| 10,458,090 B2* | 10/2019 | Raposo | | E02D 5/48 |
| 10,590,619 B2* | 3/2020 | Ronnkvist | | E02D 7/02 |
| 10,669,686 B2* | 6/2020 | Stroyer | | E02D 27/12 |
| 10,794,030 B2* | 10/2020 | Kemp | | E02D 5/223 |
| 10,837,677 B2* | 11/2020 | Hudson | | F24S 25/70 |
| 2009/0260316 A1* | 10/2009 | Jones | | F24S 30/425 |
| | | | | 52/745.2 |
| 2014/0301791 A1* | 10/2014 | Shahnazarian | | E02D 5/56 |
| | | | | 405/252.1 |
| 2018/0148901 A1* | 5/2018 | Kemp | | E02D 5/223 |
| 2019/0372514 A1* | 12/2019 | Almy | | F24S 25/617 |
| 2020/0149241 A1* | 5/2020 | Flanigan | | E02D 7/22 |
| 2020/0207486 A1* | 7/2020 | Correa Escobar | | B64F 1/26 |
| 2020/0248424 A1* | 8/2020 | Hudson | | E04H 12/2269 |
| 2021/0010217 A1* | 1/2021 | Kemp | | E02D 5/223 |

FOREIGN PATENT DOCUMENTS

| | | | |
|---|---|---|---|
| CN | 107012859 A * | 8/2017 | |
| WO | WO-9312312 A1 * | 6/1993 | ............ E01F 9/635 |
| WO | WO-2004063294 A1 * | 7/2004 | ............ C08F 251/02 |

\* cited by examiner

TRUSS FOUNDATIONS WITH IMPROVED CORROSION RESISTANCE AND RELATED SYSTEMS, METHODS AND MACHINES

RELATED APPLICATION

The present application claims priority to U.S. Provisional Application No. 62/820,776, of the same title, filed Mar. 19, 2019, and U.S. Provisional Application No. 62/801,604, titled "Articulating pile coupler and related systems and methods," filed Feb. 5, 2015, the disclosures of which are hereby incorporated by reference in their entirety for all purposes.

TECHNICAL FIELD

The present system relates to corrosion protection systems for foundations that support single-axis solar trackers thereon.

BACKGROUND

Solar energy harnesses the essentially limitless supply of energy emanating from the sun. A solar cell is a sandwich of positive and negatively doped layers of silicon on either side of an absorber layer. When photons strike the surface of the cell, they cause electrons in the absorber layer to go from a lower energy ground state to a higher energy excited state. The P-N junction induces an electric field around the absorber layer that allows current to flow in a controlled manner. This direct current is converted to alternating in an inverter and fed into the grid or consumed onsite.

Distributed solar is typically configured as small grid-connected rooftop arrays on homes and businesses. So-called utility scale solar systems are ground-based and usually configured as fixed-tilt arrays or single-axis trackers. Fixed-tilt arrays are oriented along East-West rows and inclined at an angle with respect to the ground that is dictated by the latitude of the array site. Single-axis trackers are oriented along North-South rows and use a torque tube that rotates slowly throughout the day to allow the solar panels to remain orthogonal to the sun as its position moves from East to West each day.

All ground-mounted solar arrays must contend with the problem of corrosion. Corrosion is the gradual destruction of materials via chemical or electrochemical reaction with their environment. Non-stainless steel that is exposed to outdoor conditions will inevitably undergo corrosion, even if only exposed to air. Foundation components that penetrate the ground are exposed to harsher corrosive environments because they are in contact with reactive soils and sometimes water, both of which will expedite corrosion over above-ground atmospheric conditions. The industry standard calls for using galvanized steel in to protect these components from corrosion.

In the context of single-axis solar trackers, the monopiles that are currently used to support them are cannot be optimized to their environment because that are one-piece components. This is a consequence of their design. Relatively speaking, monopiles are not good at resisting bending forces. Therefore, to deal with this, much larger piles are used than that necessary to support the weight of the array alone. Also, because of corrosion, it is assumed that percentage of the pile's thickness will disappear each year. Therefore, if the system is expected to perform for 30 years than there must be enough uncorroded material left at year 30 to withstand the worst cases forces. As a result, in the system must be over spec-ed so that it continues to be perform to minimums levels over its entire financed life. The monopile paradigm mandates this.

What is instead desired is a system that customizes each component to the specific corrosive environment it will be exposed to. Ideally, such a system will conserve the amount of material used in the components that form the foundation. In addition, such a system will be strong enough be able to resist the forces that a single-axis tracker must resist.

SUMMARY

In preferred aspects, the present system provides a corrosion resistance system for use in general with foundations that extend below and above ground. In exemplary aspects, the present system is ideally suited for use with foundations used for creating structures that support single-axis solar trackers thereon but is not so limited.

In one preferred aspect, the present system provides a truss leg comprising: a first elongated member having an open hollow shaft; a second elongated member having an open hollow shaft; and a connecting portion for joining second elongated member to the first elongated member, wherein the first and second elongated members each have a first corrosion protection layer formed on inner and outer surfaces thereof, and the first member has a second corrosion protection layer formed over the first protection layer on the outer surface only.

In another preferred aspect, the present system provides A truss foundation system comprising: a pair screw anchors, each screw anchor comprising an elongated body with a circular cross section that is open at both ends; and a pair of upper legs, wherein the screw anchors and upper legs have a first corrosion resistance layer formed on inner and outer surfaces thereof, and the screw anchors have a second corrosion resistance layer formed over the first layer on the outer surface only.

A truss component installed by a method that reduces a rate of internal corrosion comprising: driving an open screw anchor into supporting medium with a rotary driver, the screw anchor having a first corrosion resistance layer on inner and outer surfaces thereof and a second corrosion resistance layer over the first corrosion resistance layer on the outer surface only; passing a mandrel through the screw anchor into the supporting medium while driving; and releasing pressurized air proximate to a tip of the mandrel within the screw anchor to blow the medium out of the top end so that the open screw anchor is substantially devoid of the medium after driving.

As such, the present foundation system for single-axis trackers preferably utilizes truss foundation rather than monopiles. A-frame-shaped trusses have the advantage of translating lateral loads into axial forces of tension and compression rather than bending. Moreover, because columns are relatively good at resisting axial loads, the legs of an A-frame can be much smaller than an equivalent monopile supporting the same sized tracker (thus conserving material).

Another advantage of trusses stems from their modularity. H-piles are unitary in nature and are manufactured with uniform thickness and to a uniform finish. That means that even though only a portion of the H-pile is below ground, the entire pile is made to deal with the worst-case under-ground corrosion conditions. The two-sided geometry of the H-pile means that the flanges and web are corroding from two-sides at once, requiring the flanges to be doubly thick. In contrast, the embodiments of the present system disclosed herein take advantage of a truss's potential modularity to customize each component to perform to its specific corrosive environment and to provide installation methods and machines that reduce the rate of corrosion for underground components.

It is to be understood that although the present system is ideally suited for use with single-axis trackers, the present system is not so limited. In fact, it can be used to support other solar systems and also, to provide foundations outside of the solar tracker field.

DETAILED DESCRIPTION OF THE DRAWINGS

The following description is intended to convey a thorough understanding of the embodiments described by providing a number of specific embodiments and details involving foundation piles for single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

Figure 1:
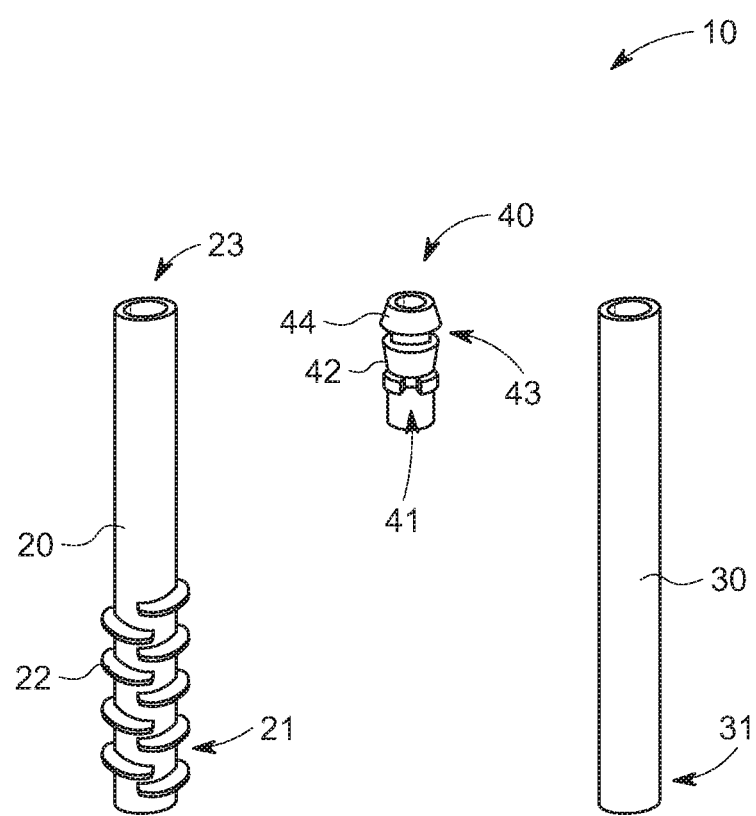
FIG. 1 is an illustration of an unassembled two-piece truss leg with a coupler for use in constructing an A-frame foundation according to various embodiments of the invention.

Turning to the drawing figures, FIG. 1 shows an exploded view of a two-piece truss leg 10 for an A-frame or truss foundation according to various embodiments of the invention. System 10 includes screw anchor 20 that is driven into a supporting medium (e.g., underlying ground) such as soil, dirt, sand, etc. and an upper leg or extension pile 30 that attaches to the above-ground end of screw anchor 20 along substantially the same axis. Both components 20 and 30 are made from substantially uniform diameter steel pipe, though screw anchors 20 and upper legs 30 are not necessarily the same diameter. In various embodiments, screw anchor 20 has partial or full thread form 22 on its outer surface beginning at the lower (below-ground) end 21, as shown. Thread form 22 assists with driving and significantly increases the anchors resistance to axial forces trying to pull it out or push it further into the ground. Though only partial thread forms 22 are shown, it should be appreciated that in various embodiments, a full thread form may instead circumscribe the outer diameter of the pile beginning at the lower end 21 for several complete revolutions.

In this example, a connecting portion 40 is attached to the top end of screw anchor 20. As shown, connecting portion 40 is configured as a collar that extend over a portion of the end of screw anchor 20. In various embodiments, one or more spot welds may be used to secure connecting portion 40 to top end 23 of screw anchor 20. Connecting portion 40 shown here also includes a coupling portion 42/43/44 that projects away from screw anchor 20 to fit into lower end 31 of upper leg 30. In various embodiments, upper leg 30 will fit over the coupling until it rests against driving features formed in connecting portion 40. In various embodiments, coupling portion 42/43/44 rely on crimping deformation to upper leg 30 to screw anchor 20. It should be appreciated, however, that in various embodiments other known joining means may be used to connect upper leg 30 to screw anchor 20 to substantially extend the axis of the screw anchor 20 through upper leg 30.

Connection portion 40 shown here serves multiple purposes. First, in various embodiments, it includes one or more indents 41, identified and referred to generally herein as "driving features", that enable the head of a rotary driver (not shown) to selectively engage it to transfer torque to pile 20 during the driving process. Second, connecting portion 40 extends from the top of screw anchor 20 up into the open lower end 31 of upper leg 30 enabling the two components to be axial joined into a substantially unitary structure. The driving features provide a stop that limits the depth of connecting portion 40 into lower end 31. Specifically, the portion of the connecting portion 40 above indents 41 is received into the lower end 31 of upper leg 30. Indentation 43 near the approximate middle of connecting portion 40 provides a void that enables an external crimping device to crimp bottom end 31 of upper leg 30 over and inwards toward collar 40. Finally, upper and lower opposing (and optionally angled) surfaces 42 and 44 of connection portion 40 (which are located above and below indentation 43) can allow some degree of axial articulation of upper leg 30 with respect to screw anchor 20. Axial adjustment here may in various embodiments be made before crimping occurs to set upper leg 30 at the correct orientation. In various embodiments, this may allow compensating for misalignment of the driven screw anchor relative to an intended apex of the truss.

Figure 2A:
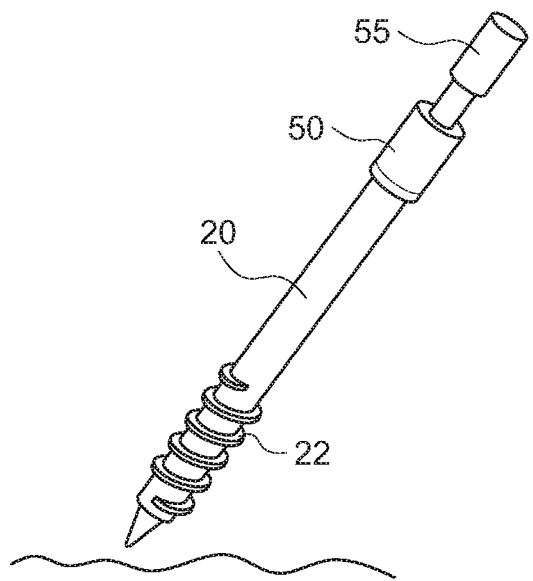
FIG. 2A is an illustration of a screw anchor with a system for driving the screw anchor into the ground according to various embodiments of the invention.
Figure 2B:
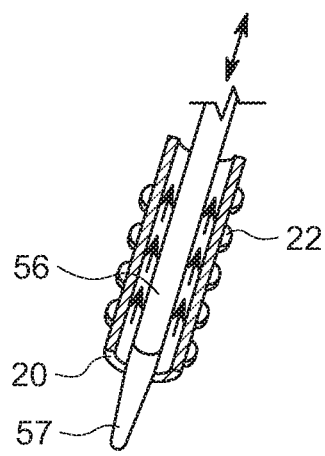
FIG. 2B is a partial cut-away view of the lower end of the screw anchor of 2A showing a mandrel positioned therein.

The present system also includes a novel and non-obvious driving machine and related systems and methods for driving screw anchors 20 into underlying ground that takes advantage of the two-piece paradigm. To that end, FIGS. 2A and 2B show a portion of such a machine driving screw anchor 20 into a support medium (e.g., underlying ground, soil, etc.). For ease of illustration, the machine itself has been omitted. In various embodiments, the machine may be a special purpose tracked or wheeled chassis with a motor, controls, hydraulics and an air compressor. A mast may attach to an articulating arm on the machine and the driving components may travel on the mast.

When operating this machine, screw anchor 20 is loaded onto rotary driver 50 that travels along a main axis of the mast that, in various embodiments, is co-linear with the driving axis of screw anchor. Rotary driver 50 provides rotational torque as well as downward pressure under control of a control unit to drive screw anchor 20 into the supporting medium below the machine using the appropriate feed and speed for the dimensions of the thread form 22 (or partial thread form) thereon. Basically, the machine drives screw anchor 20 into the ground in a manner analogous to driving a conventional screw into wood or self-tapping screw into metal. At the same time, mandrel driver 55 is actuated on the same mast to actuate the mandrel (56 in FIG. 2B) through the screw anchor. Actuating mandrel 56 may comprise exerting downward pressure on the mandrel. In other embodiments, actuating mandrel 56 may comprise applying a hammering force to the head of the mandrel with mandrel driver 55. In still further embodiments, it may comprise both actions or combinations of both. In various embodiments, mandrel 56 passes through rotary driver 55 and down inside the shaft of screw anchor 20 until tip 57 emerges from lower end 21 of screw anchor 20. In various embodiments, compressed air may be used to hammer mandrel 56 within and through base pile 20 as rotary driver 55 pushes and rotates it into the ground. In various embodiments, mandrel 56 may pause when the target depth is reached while rotary driver 55 continues to drive screw anchor 20, thereby filling any void left by the mandrel. In various embodiments, mandrel 56 may emit pressurized air within screw anchor 20 between hammering motions to eject the surrounding medium (e.g., soil, sand, gravel, etc.) out of the screw anchor in the annular space between the inner surface of screw anchor 20 and mandrel 56. The result is that when screw anchor 20 reaches its target depth, such as that shown in FIG. 2C, it will ideally be substantially devoid of any medium (e.g.: ground or earth) inside. This is significant because keeping the inner surface of screw anchor 20 free of contact with the soil will retard the rate of corrosion, making it close to the rate of corrosion of the above-ground portion. The medium in contact with the surface of the metal dictates the rate of corrosion. Denser, electrically conductive mediums such as soil and water will accelerate corrosion relative to air when oxygen is present. The outer surface of screw anchor 20 will be surrounded by soil, providing an electrolytic path between the anode and cathode, allowing it to corrode much faster. To the extent additional corrosion protection is added to screw anchor 20, driving screw anchor 20 so that it is substantially empty inside may permit this additional protection to be added only to the outside surface of the screw anchor, since the outside and inside will corrode at different rates, thereby reducing the cost and making it easier to apply, as discussed further in the context of FIGS. 4A and B.

Figure 2C:
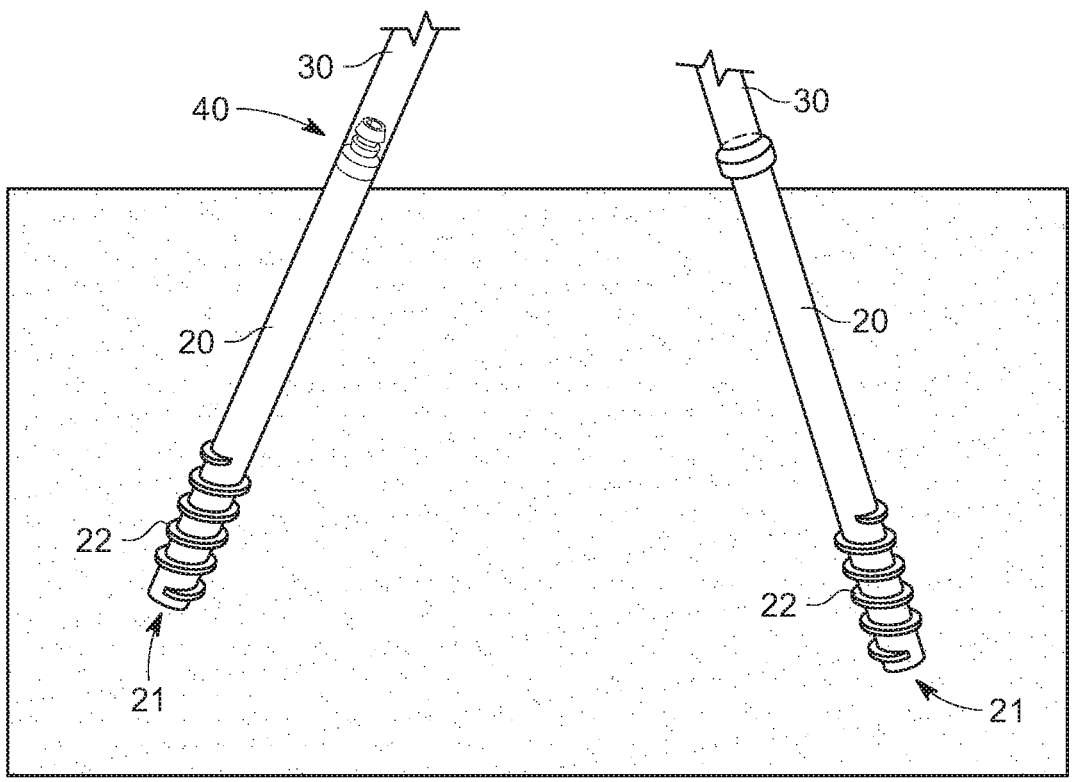
FIG. 2C is a side elevation view of a pair of screw anchors and upper legs positioned in the ground at opposing angles to one another according to various embodiments of the invention.
Figure 3:
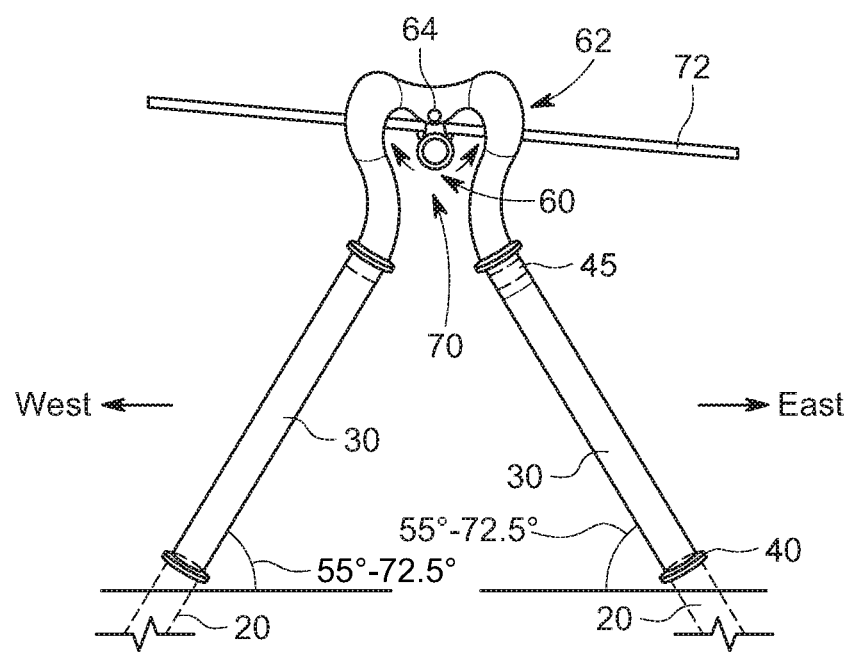
FIG. 3 is a side elevation view of a solar tracker assembly mounted onto the top of the truss foundation of FIG. 2C.

In accordance with exemplary aspects of the present system, as seen in FIGS. 2C and 3, screw anchors 20 and upper legs 30 may be used to form the legs of A-frame-shaped truss foundations (to optionally support single-axis solar trackers thereon). This can be done by first driving screw anchors 20 into supporting ground at angles to one another so that they are substantially aligned and point at a desired apex of the truss. Advantageously, if screw anchors 20 become misaligned from the intended apex, crimp coupler 40 allows some axial adjustment to enable the upper legs 30 to be re-oriented to point at the apex. As such, the present system also includes adjusting a rotational axis of the ground screw driving machine to a desired driving angle prior to actuating the rotary driver to begin driving the screw anchor into underlying ground at the desired angle.

In various embodiments, both screw anchors 20 and upper legs 30 making up each leg of the A-frame are made from steel. To resist corrosion, ferrous steel is treated with a corrosion resistant coating such as zinc, which is applied through a process known as hot-dipped galvanization or HDG. The zinc acts as a sacrificial layer that protects the underlying steel until it has been physically exhausted, extending the useful life of the steel by several years. Only after the HDG is consumed does the underlying steel begin to degrade. For example, if steel exposed to air corrodes at rate of X microns per year, and a minimum of y microns must be present to enable it to meet its structural requirements, then untreated steel must be Y+X*N thick where N is the number of years the structure must remain functional. In the context of piles 20 and 30, the steel is made thicker than it needs to be initially so that as it corrodes over time, first by exhausting the galvanization and then by destruction of the underlying steel, there is enough material remaining for it to maintain its integrity through the last year of its useful life. Applying an HDG coating to the steel will delay corrosion of the underlying steel by several years, depending on how thick it is applied and the conditions it is exposed to.

When forming A-frames for single-axis solar trackers, steel screw anchors 20 are driven into the ground with a screw driving machine so that much but not all the pile is underground while the rest (e.g., top end 23) remains above ground, as seen in FIG. 2C. Above-ground and below ground steel will generally be exposed to different corrosive environments and therefore corrode at different rates. If screw anchor 20 is manufactured with the requisite thickness and anti-corrosive coating required to survive above-ground conditions, the below ground portion will likely fail before its useful life (e.g., 30+ years) is reached. Therefore, screw anchors 20 are instead preferably specified to the worse-case below-ground conditions. If this same treatment is applied to the above-ground components, as is done with conventional H-piles, steel and zinc coatings will be wasted because the above-ground components don't require the same level of corrosion resistance. With H-piles it is too expensive and cumbersome to manufacture them to two different thicknesses so instead the entire structure is manufactured to survive the worst-case conditions.

Figure 4A:
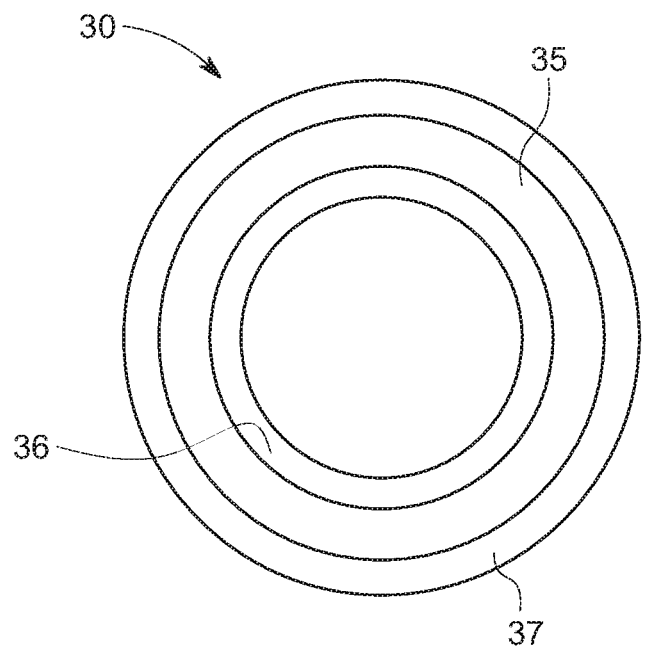
FIG. 4A is a sectional elevation view through one of the upper legs of the present system.

In accordance with the present system, however, the two-piece leg assembly 10 (i.e.: screw anchors 20 and upper legs 30) that is hollow in its center provides an opportunity to tune each component to meet but not necessarily to exceed the specific corrosion conditions it will face, as discussed further in the context of FIGS. 4A and B. As a result, this two-piece approach provides a more efficient allocation of material. In addition, the present two-piece truss leg system 10 provides logistical advantages in that smaller components are easier to move around, to perform post-manufacturing process steps on, and are easier to install compared to heavier and longer one-piece H-piles.

FIG. 3 shows a completed A-frame-shaped truss foundation supporting a torque tube of a single-axis tracker according to various exemplary embodiments. Respective screw anchors 20 and upper legs 30 are joined together to form the legs of the A-frame. In this example, a free end of each upper leg 30 is joined with a cardioid-shaped bearing housing assembly 62. Torque tube 70 is suspended from a bearing pin 64 passing through bearing housing assembly 62. Solar panels 72 may be attached to torque tube 70 using a modified C-clamp that engages with a module bracket that attaches to respective frames of two adjacent panels. In some embodiments, the legs of the A-frame (i.e.: screw anchors 20 and upper legs 30) define a substantially East-West oriented planar section that may or may not be vertical depending on the slope of the underlying support surface. As shown, couplers 80 may be used to join screw anchors and upper legs 30 and 20 and to join the upper legs 30 to bearing housing assembly 62. Though not shown, in an installed solar tracker, several such A-frame foundations with bearing housing assemblies can be spaced along the North-South row of the tracker as well as at least one A-frame foundation supporting a torque tube drive motor. It should be appreciated that although a top-down or mechanically balanced system in which the torque tube 70 hangs from a hinge point 64 is shown here, various embodiments of the invention are also compatible with bottom-up systems where the torque tube rotates about its own axis inside while captured inside of a cylindrical bearing assembly. In such a system, the bearing joins the legs of the A-frame or it may attach to and/or sit on an adapter that joins them together, all keeping within the scope of the present system.

Figure 5:
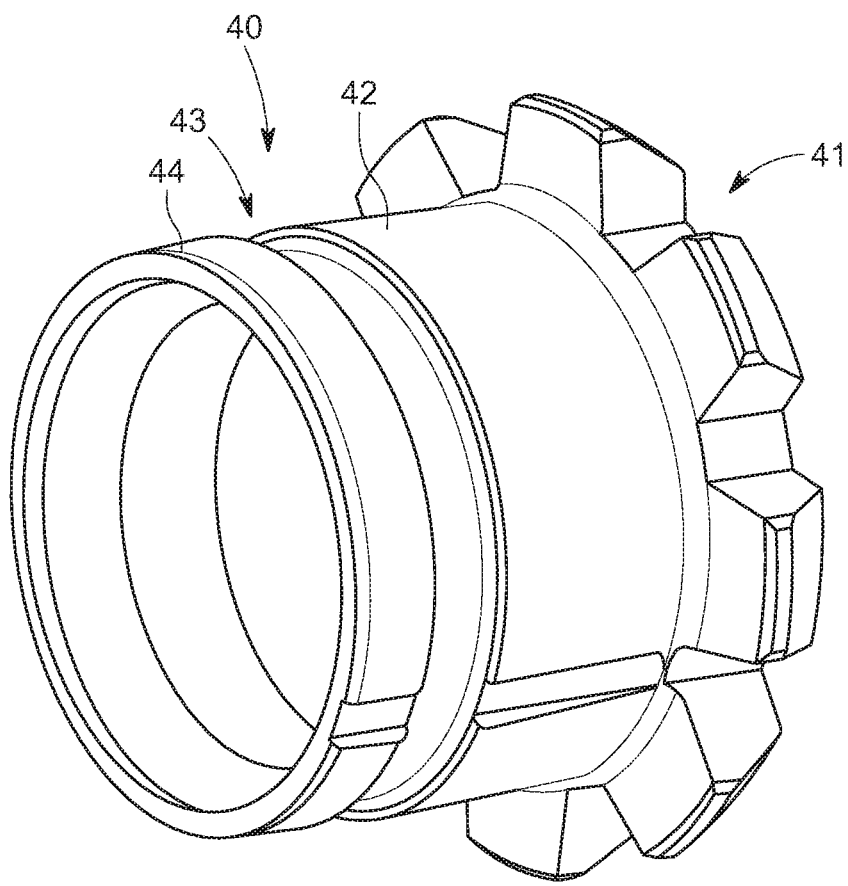
FIG. 5 is a perspective close-up view of the coupler for joining the screw anchor to the upper leg of the truss according to various embodiments.

With reference to FIG. 5, this figure shows coupling 40 according to various exemplary embodiments of the invention. In various embodiments coupling 40 is a unitary structure. It may be attached to the upper, above-ground end of ground screw 20 by inserting the end of ground screw 20 into the end of coupling 40 with driving features 41 until it hits a stop internal to the coupling. One or more welds between upper end 23 of anchor 20 and coupling 40 may secure it to the anchor. In various embodiments, driving features 41 enable a chuck of a screw driver or rotary driver to engage with the coupling 40 to drive screw anchor 20 into supporting ground. The remaining portions of coupling 40 may enable connection of upper leg 30 to the upper end 23 of anchor 20, substantially extending the main axis thereof. The connecting portions include opposing sloped surfaces 44 and 42 that will project above screw anchor 20 when coupling 40 is attached to it. In various embodiments, opposing sloped surfaces 44 and 42 reach a maximum outside diameter at the point where they both intersect with channel 43. When upper leg 30 is inserted over this connecting portion, the connecting portion will extend into the upper leg until it bottoms out on driving features 41, which effectively create a ledge for upper leg 30 to rest on. Opposing sloped surfaces 44/42 will enable some axial adjustment between upper leg and the fixed axis defined by driven screw anchor 20. In various embodiments, this may be useful for correcting for any axial misalignment of screw anchor 20 with an intended apex of the truss that was introduced when driving the screw anchor. After upper leg 30 has been oriented to the desired orientation with respect to screw anchor 20 via surfaces 44/42, a crimping tool may be used to impart a crimp to upper leg 30 over channel 43 formed in the connecting portion of coupling 40. Also, it should be appreciated that in various embodiments, coupling 40 may be used in place of coupling 45 shown in FIG. 3, however, driving features 41 will not be necessary at that location the truss because upper legs 30 are joined to bearing housing assembly 62 without requiring a driver. The ledge provided by driving features 41 may still serve as a stop, however, it may not be necessary to remove material from the coupling 41 to create the driving features, eliminating at least one process step in the manufacture of coupling 45 relative to coupling 40.

Turning back to corrosion resistance, as discussed herein, using a two-piece leg facilitates component-level optimization so that the proper materials may be used for each environment rather than using the most robust materials for all. Today, single-axis trackers are financed against power purchase agreements (PPAs) lasting thirty, thirty-five or even forty-years. That means the system components need to be capable of remaining operable for that time. Given that below-ground components will likely corrode faster than those above-ground, it is possible to specify these components differently and still achieve the full-life expectancy.

As discussed herein, upper legs 30 are exposed primarily to atmospheric conditions. Therefore, knowing the rate of corrosion for steel under atmospheric conditions, a galvanizing material may be applied to steel tube of known thickness to ensure that the steel in the upper legs remaining at the end of the PPA term will be thick enough to meet the minimum structural requirements. FIG. 4A is a cross-sectional view showing an exemplary upper leg 30 according to various embodiments of the invention. Steel tube 35 making up upper leg 30 may have a diameter of approximately 76 mm with a nominal wall thickness of 2 mm; galvanizing layers 36 and 37 may add 46-65 μm to both the outside and inside dimensions. In cross-section, this results in three distinct rings of material—a layer of steel encased in inner and outer layers of zinc.

Figure 4B:
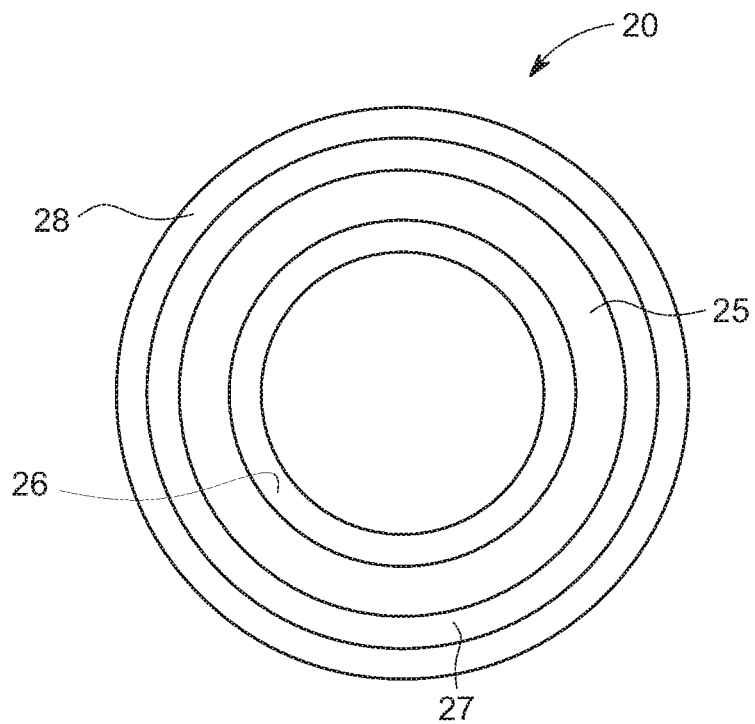
FIG. 4B is a is a sectional elevation view through one of the screw anchors of the present system.

By contrast, screw anchors 20 will live almost entirely underground. Below-ground corrosion rates will vary depending on the reactivity of the soil and to what extent it is disturbed before and during driving but, generally speaking, the rate of corrosion for metals in contact with soil are greater than those exposed only to atmospheric conditions. FIG. 4B. is a cross-sectional view showing the composition an exemplary screw anchor 20 according to various embodiments of the invention. The screw anchor 20 shown here is made of steel tube 25. In various embodiments, it may have an outside diameter of approximately 60 mm and nominal wall thickness of 2.5 mm. HDG coating layers 26 and 27 add another 100 μm to both the inside and outside surfaces. In addition, in this example, a layer of scratch resistant polymer or fusion bonded epoxy coating 28 has been added on top of HDG layer 27 on the outside of the anchor only. This layer 28 can vary in thickness depending on the type of material used and the thickness of the applied coating. It may add as little as a couple of mils up to 20 mils in additional thickness. One mil is equivalent to 25.4 μm so the coating may be thinner than, roughly equivalent to, or even thicker than the layer of HDG. In various embodiments, however, because screw anchor 20 is installed so that it its hollow center is substantially devoid of any surrounding medium, it may be possible to apply layer 28 to the outside only. This will vastly simplify the application process because such coatings are often applied via powder coating or other spray-on application process that can be difficult to apply uniformly to the inside of a tube. Exemplary materials that could be used include but are not limited to epoxy resins such as Bisphenol A, Bisphenol B, Phenolic Novolin and hardeners including but not limited to Polyamide, Amidoamine, Aromatic Amine, Aliphatic Amine, Phenylamine, Cycloaliphatic Amine, and Aliphatic Amine Adducts.

In various embodiments, it may be desirable to apply different corrosion resistant coatings to screw anchors 20 and upper legs 30 without them sharing at least one common coating. For example, in various embodiments, screw anchors 20 may only be coated in epoxy and/or polymer or other coating, and not galvanized, while upper legs galvanized only. Such modifications are within the spirit and scope of the invention, which focuses on systems where below and above-ground components are treated differently to account for their specific corrosion environment.

It should be appreciated that the embodiments described and claimed herein are exemplary only. Those of ordinary skill in the art will appreciate modifications and substitutions that retain the spirit and scope of the invention.

What is claimed is:

1. A truss foundation system comprising:
   a pair of screw anchors, each screw anchor comprising an elongated body with a circular cross section that is open at both ends;
   a pair of upper legs, wherein each upper leg has a first corrosion protection layer made of a first material and each screw anchor of the pair of screw anchors has at least one second corrosion protection layer made of a second material that is different than the first material;

a driving coupler at one end of each screw anchor for driving the screw anchor that is received in one of the pair of upper legs to form a single truss leg; and an adapter with a pair of connecting portions oriented at opposing angles that are received in a respective upper leg of the pair of upper legs for joining the adapter to each single truss leg to form a unitary truss foundation with the ground.

2. The system according to claim 1, wherein the pair of screw anchors and the pair of upper legs have at least one common corrosion protection layer.

3. The system according to claim 2, wherein the common corrosion protection layer is formed on inner and outer surfaces thereof, and the at least one second corrosion protection layer on the outer surface only.

4. The system according to claim 2, wherein the common corrosion protection layer is hot-dipped galvanization.

5. The system according to claim 2, wherein the at least one second corrosion protection layer is selected from the group consisting of scratch resistant polymer and fusion bonded epoxy.

6. The system according to claim 1, wherein each driving coupler is attached to an upper end of each screw anchor and provides a driving feature adapted to mate with a rotary driving tool.

7. The system according to claim 1, where each driving coupler has a curved profile that allows for axial adjustment between the screw anchor and the upper leg to compensate for misalignment of the screw anchor with respect to an intended orientation.

* * * * *